US011300782B2

(12) United States Patent
Goegler et al.

(10) Patent No.: US 11,300,782 B2
(45) Date of Patent: Apr. 12, 2022

(54) MICROSCOPY METHOD AND MICROSCOPE FOR IMAGING AN OBJECT

(71) Applicant: Carl Zeiss Microscopy GmbH, Jena (DE)

(72) Inventors: Michael Goegler, Wolfratshausen (DE); Juergen Fechti, Goettingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/204,709

(22) Filed: Mar. 17, 2021

(65) Prior Publication Data

US 2021/0199955 A1 Jul. 1, 2021

Related U.S. Application Data

(63) Continuation of application No. 15/926,834, filed on Mar. 20, 2018, now abandoned.

(30) Foreign Application Priority Data

Mar. 20, 2017 (DE) .......................... 102017105926.1

(51) Int. Cl.
*G02B 21/00* (2006.01)
*G02B 27/00* (2006.01)
(Continued)

(52) U.S. Cl.
CPC ....... *G02B 27/0068* (2013.01); *G02B 21/025* (2013.01); *G02B 21/086* (2013.01);
(Continued)

(58) Field of Classification Search
CPC .. G02B 21/00; G02B 21/006; G02B 21/0072; G02B 21/025; G02B 21/06;
(Continued)

(56) References Cited

U.S. PATENT DOCUMENTS 6,330,106 B1 12/2001 Greenwald
6,473,228 B1 10/2002 Toshimitsu
(Continued)

FOREIGN PATENT DOCUMENTS

CN 1773212 A 5/2006
EP 1988417 A1 11/2008
(Continued)

OTHER PUBLICATIONS

Kner et al., "High-resolution wide-field microscopy with adaptive optics for spherical aberration correction and motionless focusing", J Microsc., 237(2):136-147 (Feb. 2010).
(Continued)

*Primary Examiner* — Thong Q Nguyen
(74) *Attorney, Agent, or Firm* — Christensen, Fonder, Dardi & Herbert PLLC

(57) ABSTRACT

A microscope and a microscopy method for imaging an object, wherein use is made of a microscope comprising an objective which defines an optical axis and a focal plane perpendicular thereto, and an adjustable correction optical unit which, at the objective, corrects a spherical aberration occurring when imaging the object with a certain depth position of the focal plane. The method comprises the following steps: determining an actual type of object; reading a database in which refractive indices of different types of objects are stored in order to determine the refractive index of the object; using a relationship between the refractive index and the spherical aberration caused by the object in order to ascertain an adjustment value of the correction optical unit such that there is a reduction in the spherical aberration in the focal plane; adjusting the correction optical unit to the adjustment value; and imaging the object.

19 Claims, 3 Drawing Sheets

(51) Int. Cl.
  *G02B 21/08* (2006.01)
  *G02B 21/24* (2006.01)
  *G02B 21/16* (2006.01)
  *G02B 21/02* (2006.01)
  *G02B 21/26* (2006.01)
  *G02B 21/36* (2006.01)
  *G02B 21/06* (2006.01)

(52) U.S. Cl.
  CPC ........... *G02B 21/16* (2013.01); *G02B 21/248* (2013.01); *G02B 21/26* (2013.01); *G02B 21/365* (2013.01); *G02B 27/0025* (2013.01); *G02B 21/06* (2013.01)

(58) Field of Classification Search
  CPC .. G02B 21/086; G02B 21/248; G02B 21/365; G02B 27/00; G02B 27/0012; G02B 27/0025; G02B 27/005; G02B 27/0068
  USPC ......................................... 359/368–390, 637
  See application file for complete search history.

(56) References Cited

U.S. PATENT DOCUMENTS

| | | |
|---|---|---|
| 7,825,360 B2 | 11/2010 | Karasawa et al. |
| 8,848,199 B2 | 9/2014 | Choi et al. |
| 2005/0024718 A1 | 2/2005 | Sase et al. |
| 2006/0098213 A1 | 5/2006 | Itoh et al. |
| 2008/0310016 A1 | 12/2008 | Karasawa et al. |
| 2011/0102572 A1 | 5/2011 | Kihara et al. |
| 2011/0141260 A1 | 6/2011 | Ouchi et al. |
| 2013/0278941 A1 | 10/2013 | Loerch |
| 2014/0233094 A1 | 8/2014 | Ue et al. |
| 2015/0015871 A1 | 1/2015 | Tamano |
| 2015/0022882 A1 | 1/2015 | Ue et al. |
| 2016/0170193 A1 | 6/2016 | Ue |
| 2016/0259163 A1 | 9/2016 | Hoegele et al. |
| 2017/0017070 A1* | 1/2017 | Suzuki ................. G02B 21/367 |
| 2017/0017071 A1 | 1/2017 | Ue et al. |
| 2019/0310454 A1 | 10/2019 | Shimada |
| 2020/0110254 A1* | 4/2020 | Goegler ................. G02B 21/14 |

FOREIGN PATENT DOCUMENTS

| | | |
|---|---|---|
| EP | 2642326 A2 | 3/2013 |
| EP | 3 118 665 A1 | 1/2017 |
| JP | 2005/043624 A | 2/2005 |
| JP | 2017-026664 A | 2/2017 |
| WO | WO 2005/096062 A1 | 10/2005 |
| WO | WO 2009/096522 A1 | 8/2009 |

OTHER PUBLICATIONS

Leica Microsystems CMS Gmbh, Flyer, "Living up to Life", 4 pages, www.leica-microsystems.com (2012).

Olympus Flyer "Flourescence and CLSM, FSX100 and FluoView FV10i, All-in-One Box Microscopes", Olympus Europa Holding GmbH in Hamburg, Germany, 20 pages (Apr. 2010).

Schwertner et al., "Simple optimization procedure for objective lens correction collar setting", Journal of Microscopy, 217(Pt 3):184-187 (Sep. 10, 2004).

Yoo et al., "Automated spherical aberration correction in scanning confocal microscopy", Review of Scientific Instruments, 85:123706-123706-9 (2014).

* cited by examiner

MICROSCOPY METHOD AND MICROSCOPE FOR IMAGING AN OBJECT

CROSS REFERENCE TO RELATED APPLICATIONS

This application claims priority to German Patent Application No. 102017105926.1 filed Mar. 20, 2017, the disclosure of which is incorporated herein in its entirety by reference.

FIELD OF THE INVENTION

The invention relates to a method for imaging an object by means of a microscope comprising an objective and a correction optical unit. The objective defines a focal plane. The correction optical unit is adjustable to correct a spherical aberration occurring when imaging the object at the focal plane. Further, the invention relates to such a microscope.

BACKGROUND OF THE INVENTION

Microscopes often need to have a high degree of flexibility in research since very different types of experiments are carried out. There may be great variation both in objects to be observed and in object carriers. Imaging aberrations become ever more noticeable with increasing depth of imaging from the object. Noticeable spherical aberrations already occur at a depth of a few micrometers if there is a refractive index step in the object and the numerical aperture of the objective is comparably high (e.g., numerical aperture of 1.2, as is conventional in confocal microscopy). Imaging in three dimensions, i.e., imaging in thicker or deeper objects, becomes ever more important, for example in the case of examining cell cultures in 3D, in the case of spheroids or in the case of thicker slices. Here, an excellent image quality is required and spherical aberrations become a significant problem.

Applications, particularly in the case of fluorescence microscopy, and hence the requirement on the microscope vary greatly. By way of example, in one experiment, it may be necessary to observe only the first 10 μm of an object below a coverslip surface, while, in another experiment, however, the intention is to measure into the object to a depth of 200 μm. Similar considerations apply to temperature. One experiment is carried out at room temperature, while other experiments are performed at 37° C. Both factors influence the optical behavior of the microscope, and hence the imaging properties thereof.

Variations of the refractive index along an optical path from the focal plane in the object to the objective have a strong influence on the diffraction-limited imaging in objectives of high numerical aperture. They generate a spherical aberration. Thus, the magnifying objective generates a first optical aberration which is influenced by optical properties of the object. It is known to compensate for spherical aberration associated with imaging objects of different object carrier thicknesses, e.g., coverslip thicknesses from 0.15 mm to 1.5 mm, by providing an adjustable correction ring at the objective and setting this ring to an appropriate value to reduce the overall spherical aberration of imaging. This correction ring actuates and adjusts a correction element which introduces a second spherical aberration for compensation. Until now, it was cumbersome to adjust the correction ring to match the object properties. It is often difficult to access the correction ring and the accuracy with which the latter can be adjusted is limited. In the meantime, the prior art also disclosed motor-driven correction rings, which simplify the mechanical part of the adjustment and evade the problem of poor accessibility.

The prior art has disclosed various methods or attachments for microscopes, which operate either in an automated or in a partly automated fashion and contain an iterative procedure for correcting a spherical aberration. US 2008/0310016 A describes an automatic correction of spherical aberration in respect of thickness a coverslip. US 2005/0024718 A and JP 2005/043624 A2 describe to input of optical physical parameters by the user, from which parameters a correction of the spherical aberration is subsequently derived. US 2011/0141260 A and US 2014/0233094 A describe iterative correction methods to address spherical aberration which methods, in an image analytical fashion, evaluate the contrast or the brightness to derive a correction for the spherical aberration.

SUMMARY OF THE INVENTION

It is an object of the invention to provide a method or a microscope for imaging an object, by means of which the overall spherical aberration of the imaging of the object can be reduced in a simple manner, in particular without knowledge of the relevant optical parameters of the imaging.

The invention relates to a microscope and a method for imaging an object, wherein use is made of a microscope comprising an objective which defines an optical axis and a focal plane perpendicular thereto, and an adjustable correction optical unit which, at the objective, corrects a spherical aberration occurring when imaging the object with a certain depth position of the focal plane, wherein the method comprises the following steps: capturing a type of object; reading a database in which refractive indices of different types of objects are stored in order to determine the refractive index of the object; using a relationship between the refractive index and the spherical aberration caused by the object in order to ascertain an adjustment value of the correction optical unit such that there is a reduction in the spherical aberration in the focal plane; and adjusting the correction optical unit to the adjustment value and imaging the object. Some embodiments of the method for imaging an object use is a microscope comprising an objective which defines an optical axis and a focal plane perpendicular thereto, and a correction optical unit which is adjustable for correcting a spherical aberration occurring when imaging the object at a certain depth position of the focal plane. Some embodiments of the method comprise the following steps: capturing a type of object, reading predetermined information which links the type of object to a set value of the correction optical unit such that there is a reduction in the spherical aberration in the focal plane for this type of object, and adjusting the correction optical unit to the set value and imaging the object.

Some embodiments of the microscope for imaging an object comprise an objective which defines an optical axis and a focal plane perpendicular thereto, an adjustable correction optical unit which, at the objective, corrects a spherical aberration occurring when imaging the object with a certain depth position of the focal plane, a drive which adjusts the correction optical unit, and a control device. In some embodiments of the microscope, the control device has an interface for determining a type of object and is connected to a storage device, in which a predetermined relationship is stored, said relationship linking the type of object to a set value for the correction optical unit such that the set value realizes a reduction in spherical aberration in the focal plane for the type of object. Further, the control device is adapted to determine the type of object via the interface and to actuate the drive on the basis of the relationship in such a way that there is a reduction in the spherical aberration in the focal plane.

An advantage of the invention is that the optical properties of the object need not be known to correct spherical aberration. The experimenter need only have knowledge about the type of object. Then, the overall spherical aberration is automatically corrected to the best possible extent such that the imaging is improved. In most cases, the experimenter knows the type of object while its optical properties, such as e.g., the refractive index, are usually not known to him/her or not known sufficiently well. Moreover, the spherical aberration is adjusted quickly as an iterative method is not used, but, instead, the spherical aberration for imaging the object is minimized immediately based on the knowledge about the type of object. "Trial and error" for finding a good position of a correction ring, as was necessary in the prior art, is dispensed with.

It goes without saying that the aforementioned features and those yet to be explained below can be used not only in the combinations specified but also in other combinations or on their own, without departing from the spirit and scope of the present invention.

BRIEF DESCRIPTION OF THE DRAWINGS

The invention is explained in more detail below for example on the basis of the accompanying drawings, which may also disclose features essential to the invention. In the figures.

DETAILED DESCRIPTION

Figure 1:
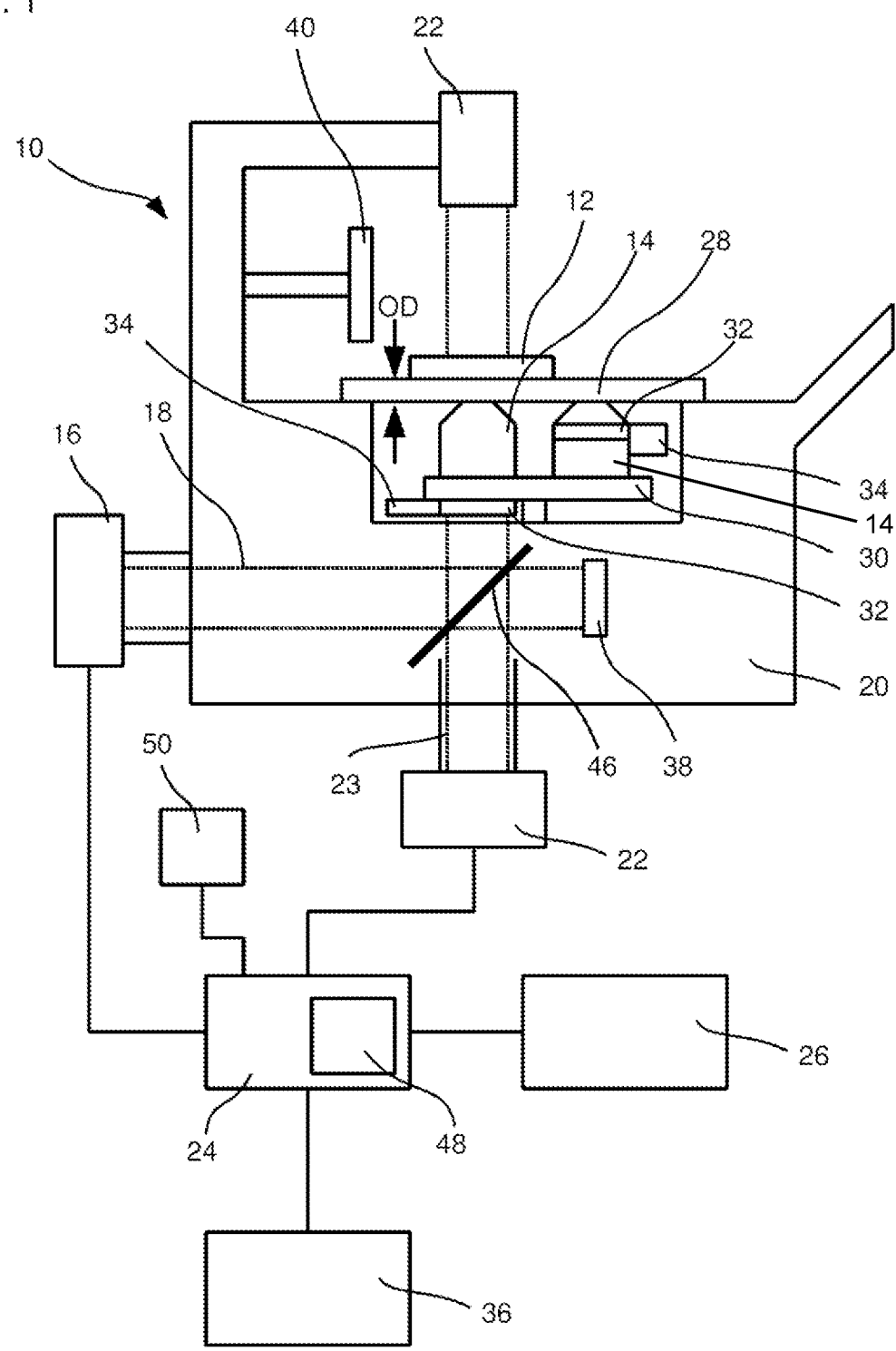
FIG. 1 shows a schematic view of a microscope.

In the method for imaging an object, use is made of a microscope which comprises a magnifying objective and an adjustable correction optical unit. The objective defines an optical axis and a focal plane perpendicular thereto and introduces a first spherical aberration influenced by optical parameters of the object to be imaged. The correction optical unit introduces an adjustable second spherical aberration serving to correct the overall spherical aberration. The method comprises the following steps: determining a type of object; reading predetermined information which links a set value for the correction optical unit to different types of objects in order to ascertain a set value for the correction optical unit such that there is a reduction in the overall spherical aberration in the focal plane. Then the correction optical unit is adjusted to the set value and the object is imaged. A two-stage approach may be used in certain embodiments. The relationship comprises a database which links the type of object and refractive index and, further, an interrelation between the refractive index and the set value.

The microscope for imaging an object comprises an objective, an adjustable correction optical unit, a drive and a control device. The objective defines an optical axis and a focal plane perpendicular thereto. It introduces a first optical aberration influenced by optical properties of the object. The correction optical unit introduces an adjustable second spherical aberration to correct the overall spherical aberration occurring when imaging the object e.g., at a certain focal plane depth position. The drive adjusts the correction optical unit regarding the second optical aberration. The control device has access to a storage device. The type of object can be detected over an interface. The mentioned relationship is stored in the storage device, for example as a database with refractive indices of different types of objects and an interrelation between refractive index and set value. The control device is adapted to determine the actual type of object, e.g., by reading the interface, and to actuate the drive on the basis of set value retrieved by utilizing the relationship such that overall spherical aberration is reduced.

The method can be carried out by the control device provided for or in the microscope. The control device may be realized by a microprocessor, an electric circuit, a computer or any other programmable apparatus.

In many cases, the object comprises a specimen that should be imaged and a covering medium or embedding medium that surrounds the specimen. By way of example, the object comprises cell to be imaged and a solution in which the cell is embedded.

The objective serves to magnify the object. It may also be used to illuminate the object; then, the objective is provided not only in the imaging beam path but also as part of an illumination beam path. The same applies to the correction optical unit. The objective has an optical axis and defines the position of the focal plane. Optionally, the objective is provided with a z-drive which adjusts the position of the focal plane. The z-drive may be connected to the control device such that the control device is able to adjust the position of the focal plane. Moreover, the control device optionally detects the current position of the focal plane of the objective, for example from the position adopted by the z-drive.

A correction optical unit introduces a second spherical aberration which shall counter-balance the first spherical aberration which occurs when imaging the object, e.g., at a certain depth position of the focal plane. This means that the unit changes the spherical aberration. The correction optical unit is adjusted according to a set value and the second spherical aberration depends from the set value. In some cases, the correction optical unit is adjusted depending on the depth position. The correction optical unit may be the above-described correction ring at the objective. However, it is also possible that optical elements provided separately and spaced from the objective are used as the unit, said optical elements allow to introduce a second and compensating spherical aberration. The correction optical unit may be arranged behind the objective and in front of a detector. The correction optical unit may have optical elements which deflect radiation differently depending on the image height. The second optical aberration introduced by the correction optical unit is adjusted with the aid of the drive which is connected to the control device, either by lines or in a wireless manner. The control device may detect the position of the drive and thus the current adjustment of the correction optical unit. Moreover, the control device controls the adjustment correction optical unit in order to reduce the overall spherical aberration of the microscopic imaging.

An actual type of object is determined, e.g., over an interface. The interface can be an input device on which the user manually enters the type of object. Further, it is also possible to select the type of object from a predetermined group of types of object given on a predetermined list, which is optionally stored in a database. Moreover, the interface may also comprise a sensor, which detects the type of object. In one embodiment, the interface comprises a scanner which reads a marker on the object or on the object carrier in order to detect the type of object. This will be described in more detail below. By way of example, the interface may also comprise a microphone, over which the type of object can be entered by speech input. The interface may also comprise a keyboard, a mouse or an operating panel. In principle, it does not matter how the type of object is determined or detected, as long as it is determined.

A relationship links the type of object and the set value. In an optical two-stage configuration of the relationship refractive indices of different types of objects are stored in a database. The control device may be connected to the database via lines or in a wireless manner. By way of example, the database may be available in a central memory. In a development, the database is connected to the control device via the Internet such that the control device may retrieve the refractive indices dependent on the type of object by way of a data transfer. Preferably, a multiplicity of different object types and the corresponding refractive indices are pre-stored. Should a certain type of object not be provided by the database, the user may optionally enter an appropriate refractive index manually. Then, this input can be adopted by other users, and so the number of types of objects provided by the database continuously increases. Alternatively, the control device selects the closest type available in the database according to predetermined distinguishing criteria. Thus, if a certain type of object is not provided by the database, it is possible that the control device automatically selects a type of object similar to the present object, or this is done manually by the experimenter, and hence the refractive index for a similar object is used. By way of example, the database may be a table in which the various types of object are listed in one column and the corresponding refractive indices are listed in another column. The two-stage structure of the relationship further holds a interrelation between refractive index and set value which is required for the ideal correction of overall spherical aberration generated due to the assigned refractive index.

The storage device may be an internal memory of the microscope, for example the memory of a computer which provides the control device. The storage device may be a rewritable memory (RAM, random access memory) or only a readable memory (ROM, read-only memory). The storage device may be connected to the control device in a wireless fashion or by means of lines. The relationship may be a table or a function which links the refractive index to the set value of the correction optical unit. The relationship may be determined empirically such that the corresponding set value is determined experimentally in a calibration step for each refractive index. This may be done when calibrating the microscope.

The control device determines the actual type of object, e.g., over the interface, retrieves a set value for this type. In some embodiments the control device determines a refractive index, for example with the aid of the database, and obtains the value for the correction optical unit by using the interrelation. Then, the control device controls the correction optical unit in accordance with the set value such that the object can subsequently be imaged by the correction optical unit and the objective at reduced or zero overall spherical aberration because the second spherical aberration compensates the first. By way of example, the correction optical unit is adjusted by actuating the drive.

The relationship links type of object and set value of the correction optical unit required to obtain compensating second spherical aberration. As a result the user needs no longer concern himself with the optical details of the object. This is of advantage because experiments with microscopes usually are not carried out by microscopy experts but, instead, by researchers wishing to concentrate on the actual experiments. In the end, a microscope shall be an auxiliary means for carrying out experiments.

One major factor influencing the first spherical aberration is the refractive index of the object. However, there are further variables which influence the refractive index or affect spherical aberration in addition to the refractive index object. Some embodiments therefore provide further information in the relationship, e.g., the database and/or the relationship, to take account of these further variables. This may be done by providing multi-dimensional relationship. However, it is equally possible for a basic relationship to be provided, linking the type of object and the refractive index or the refractive index and set value, and to modify this basic relationships for the further variables. One example for such variable is the object temperature which may differ from normal room temperature, for example in the case of incubation experiments. Since the refractive index is temperature-dependent, it is very easily possible to correct the refractive index and/or the set value in respect of the object's temperature, for example by a correction factor.

To the extent that reference is made below to further variables being taken into account, this includes to provide a basic relationship, which does not depend on the further variable(s) and is modified in respect of the variable(s). It is however, equally, possible, that the relationship provides the set value as a function of the further variable(s). The terms "variable" and "parameter" are used interchangeably in this description. The quality of correction does not depend on this aspect. Naturally, mixed forms are also possible; that is to say, some parameters may be included in the relationship directly while others are included indirectly, e.g., modify the refractive index prior to determine the set value from the refractive index. Ultimately, all that is important is that— and not where—the at least one further parameter is taken into account in the chain from the type of object to the set value.

In order to correct the overall spherical aberration even more completely, it is preferred in a development for the type of object to be specified as a kind of specimen and/or a kind of preparation of the specimen. Information about the preparation may relate to, for example, cells for live-cell experiments, such as e.g., in-vivo or ex-vivo experiments, or for fixed-cell experiments. By way of example, the kind of preparation also comprises whether, or how, the specimen is embedded in an embedding medium. The refractive index is determined from the database in respect of covering medium and/or the kind of specimen. The kind of specimen can include various types of biological and non-biological specimens that should be imaged by the microscope.

In order to be able to determine the refractive index of the object even more easily, it is preferable in an embodiment to provide the database in a hierarchical structure in respect of the type of object, for example in the form of a tree diagram. The hierarchy may also divide the various types of objects being into groups which, in turn, are subdivided into subgroups. There may, in turn, be a further subdivision of the subgroups. Consequently, there are various levels from which the actual type of object can be selected easily in the database, e.g., by means of the interface. In the case of a hierarchic structure of the database, a user can orient himself more easily in respect of the various options relating to how the object or the embedding medium may be realized. By way of example, cell experiments are subdivided into live-cell experiments and fixed-cell experiments and these two groups are subdivided further in respect of the cell types, for example brain cells or liver cells. Then, these subdivisions are subdivided again in respect of the region of the cells from the corresponding organ or the embedding medium. The rough subdivision between life-cell experiments and fixed-cell experiments already has a significant influence on the refractive index since live-cell experiments are usually carried out in an aqueous solution while fixed-cell experiments are carried out in embedding media or mounting media which have a refractive index that differs strongly from that of water.

The first spherical aberration depends on the optical path length covered by the radiation from the focal plane to the objective. Some embodiments achieve an accurate compensation of the overall spherical aberration may by providing in the relationship the refractive index and/or set value depending on a penetration depth. The penetration depth corresponds to the path the radiation traveled from the focal plane to an object carrier or coverslip, on/under which the object is positioned. This can be optionally, measured by detecting an interface between an object carrier and the object and by detecting a position of the focal plane. The penetration depth is influenced by the depth position of the imaging and adds to the path of the radiation from the interface to the objective. Since the path, through the object carrier and between the object carrier and the objective where an immersion medium may be arranged, may be constant, some embodiments take into account only the relative portion the penetration depth has in the overall path. Then, the relationship also depends on the penetration depth.

The first spherical aberration depends, inter alia, on the penetration depth as well, i.e., on how deep the focal plane lies in the object. Various options exist for determining the penetration depth. If the distance between object carrier and objective and the focal length of the objective are known, the penetration depth may be computed as the difference of these values. Preferably, the position of the interface between the object and the object carrier can be determined by capturing a reflex of radiation caused at the interface. The focal plane of the objective can be adjusted to this reflex. If the control device determines the focal position of the objective by reading the z-drive, the position of the interface is detectable in a particularly simple manner. The current focal plane is equally, known from regarding the z-drive. The penetration depth is the z position difference between the current focal plane and the interface.

In order to simplify the relationship and nevertheless achieve a precise correction of the overall spherical aberration, it is preferable in a development to modify the relationship for in predetermined ranges of the penetration depth. Optionally, the range width depends on the numerical aperture of the objective. This development is based on the discovery that spherical aberration changes relatively slowly with penetration depth. So as not to have to modify the relationship for every arbitrarily small change in penetration depth, i.e., so as not to have to provide the set values for both the various refractive indices and each incremental change in the penetration depth, regions of the penetration depth are defined and the penetration depth has a constant impact on the set value within each range or region. Optionally, the size of these regions depends on the numerical aperture of the objective in this case. As the numerical aperture increases, the penetration depth as a greater influence on first spherical aberration and the ranges/regions are selected ever smaller. Objectives with a high numerical aperture are often used in fluorescence microscopy. By contrast, the regions can be designed wider in the case of wide-field imaging, which usually uses objectives with comparable lower numerical aperture. The size of the regions may be determined empirically.

In order to compensate for the overall spherical aberration even more completely, some embodiments determine a vale of at least one parameter influencing the first spherical aberration. This parameter can be: temperature of the object, material of an object carrier, object carrier thickness, immersion medium for the objective and/or a wavelength of radiation for imaging the object, with the relationship depending on the parameter.

It is known that the refractive index of a material depends on its temperature. Consequently, spherical aberration occurring when imaging by means of the objective also dependents on temperature. If the temperature of the object is determined, for example by means of a sensor or by way of an entry, for example if the temperature of the experiment is fixedly predetermined (e.g., in case of incubation experiments), it is possible for the relationship to contain the temperature such that a different set value is obtained in case of different temperatures. Consequently, the correction optical unit is ultimately adjusted in a temperature-dependent manner. The relationship may be determined from calibration in respect of the temperature dependence. In a development, the temperature of the object is determined by sensing an energy parameter of an illumination radiation applied to the object and by determining the temperature of the object from the energy parameter. The energy parameter may be the intensity or the power of the illumination radiation. It may be measured at the object or from a split off fraction of the illumination radiation. The temperature in the object may be calculated on the basis of energy parameter and the expected or known absorption of the illumination radiation by the object. The type of object may also be used for calculating the temperature, namely in respect of the degree of light absorption in the object.

On its path from the focal plane to the objective, the radiation passes both the object carrier and the immersion medium, which may be provided between the object carrier and the objective. Both the object carrier and the immersion medium have a certain refractive index contributing to spherical aberration. By way of example, the object carrier may be produced from plastic or glass. In many cases, the immersion medium is oil or water, which differ significantly in respect of the refractive index. By determining the object carrier thickness and entering the refractive index of the object carrier and/or the immersion medium, the relationship may also take account of these influences on spherical aberration. The relationship may be generated by calibrating in respect of object carrier thickness, material of the object carrier and/or immersion medium and/or may be adapted from a basic relationship.

The refractive index, and hence the refractive behavior of the objective, depends on the wavelength, and hence the overall spherical aberration does as well. The wavelength of imaging is consequently a further variable the relationship may contain in order to improve the compensation of spherical aberration. The relationship may be modified by calibration in respect of the wavelength, too. Laser type, filter and/or fluorescent dyes may be relevant input parameters to this end. The wavelength may be entered manually; the wavelength of any induced fluorescence radiation is known, in fluorescence imaging, and so the user may specify this wavelength. Moreover, the microscope may be provided with a wavelength sensor, by means of which the wavelength of the imaging radiation is determined in an automated manner. In the case of wide-field fluorescence experiments, it is possible, for example, to take account of fluorescence filter properties or of illumination source wavelength (e.g., LED), without a wavelength sensor needed.

In order to further automate imaging and, at the same time, achieve imaging of highest quality, it is preferable in one development for the at least one parameter and/or the type of object to be provided on the object carrier to be read automatically. A 1D or 2D bar code or a QR or any other 2D code or a radio chip may be provided on the object carrier. The interface may be adapted to capture a code on the object carrier, for example with by a scanner. In this way, the values of the aforementioned parameters may be read automatically and spherical aberration is corrected automatically in respect of these parameters. By way of example, the material of the object carrier and the thickness thereof are encoded on the object carrier and so the user needs not worry about these parameters and is consequently able to concentrate on the actual imaging of the object.

Reverting to the figures, FIG. 1 shows a microscope 10 for imaging of an object 12. Radiation reflected or transmitted by the object 12 is collected by an objective 14 from a focal plane, and the object is imaged onto an imaging detector 16 via an imaging beam path 18. The objective 14, the imaging detector 16 and/or the imaging beam path 18 are arranged within a housing 20 of the microscope 10. The imaging beam path 18 may be adapted for various types of imaging. By way of example, the object 12 can be imaged in wide field or by means of scanning imaging method or by means of TIRF (total internal reflection fluorescence). Further, the imaging beam path 18 may be adapted for fluorescence measurements. Depending on the type of imaging, the imaging beam path 18 comprises optical elements and/or further components, such as e.g., a scanning device for deflecting radiation. Such components are known for microscopes and therefore not illustrated in FIG. 1. The object 12 is illuminated from a light source 22 arranged in or at the housing 20, either by reflected light or transmitted light. The light source 22 may produce white light or emit radiation in a certain wavelength range suitable e.g., for fluorescence microscopy. Radiation is guided through an illumination beam path 23 from the light source 22 to the object 12. A beam splitter 46 splits off radiation from the imaging beam path 18. The imaging detector 16 converts the optical image of the object 12 produced by the imaging beam path 18 on the detector into electrical signals which are transmitted to a control device 24. From the electrical signals, the control device 24 produces an electronic image which is displayed to the experimenter on a display device 26, such as a monitor, connected to the control device 24. Depending on the optical properties between objective 14 and focal plane, in particular depending on the depth position of a focal plane of the objective 14, which plane is perpendicular to an optical axis of the objective 14, a first spherical aberration occurs. This first spherical aberration is induced by the magnifying and imaging action of the objective 14.

The object 12 is arranged on an object carrier 28 which has a certain object carrier thickness OD. The object carrier 28 may be a glass plate. Further, the object carrier 28 may be the base of the Petri dish made of glass or plastic. The object carrier 28 with the object 12 is displaceable in relation to the objective 14.

Optionally, the microscope 10 comprises a plurality of objectives 14 held in a revolver turret 30. The revolver turret 30 switches the objective 14, which shall be used for imaging, into the beam path. The revolver turret 30 is turned by a turret drive connected to the control device 24. Neither the turret drive nor the connection to the control device 24 are shown in FIG. 1. Optionally, the revolver turret 30 is moved manually.

One, some or all of the objectives 14 arranged in the revolver turret 30 are provided with a correction optical unit 32. Each correction optical unit 32 introduces a second special aberration which is independent from the optical properties between objective and focal plane. The correction optical unit is adjustable regarding its second spherical aberration. So the overall spherical aberration can be corrected by an appropriate setting of the correction optical unit 32 counter-balancing first and second spherical aberrations when imaging the object 12.

The objective 14 illustrated on the right in FIG. 1 and the objective 14 illustrated on the left side in FIG. 1 each have a correction ring as correction optical unit 32. This correction ring is connected to the objective 14. The correction ring is adjustable through a drive 34. The drive 34 is controlled by the control device 24 via cable or radio, with the connection not being illustrated in FIG. 1. The control device 24 controls the drive 34 and compensates the overall spherical aberration, thus. Optionally, the control device 24 may detect the current setting of the correction optical unit 32. The correction optical unit 32 may be arranged separately and detached from the objective 14. In the objective 14 illustrated on the left in FIG. 1, the correction optical unit 32 is arranged in the imaging beam path 18 and introduces the second spherical aberration for counter-balancing. Here too, the correction optical unit 32 is provided with a drive 34.

Figure 2:
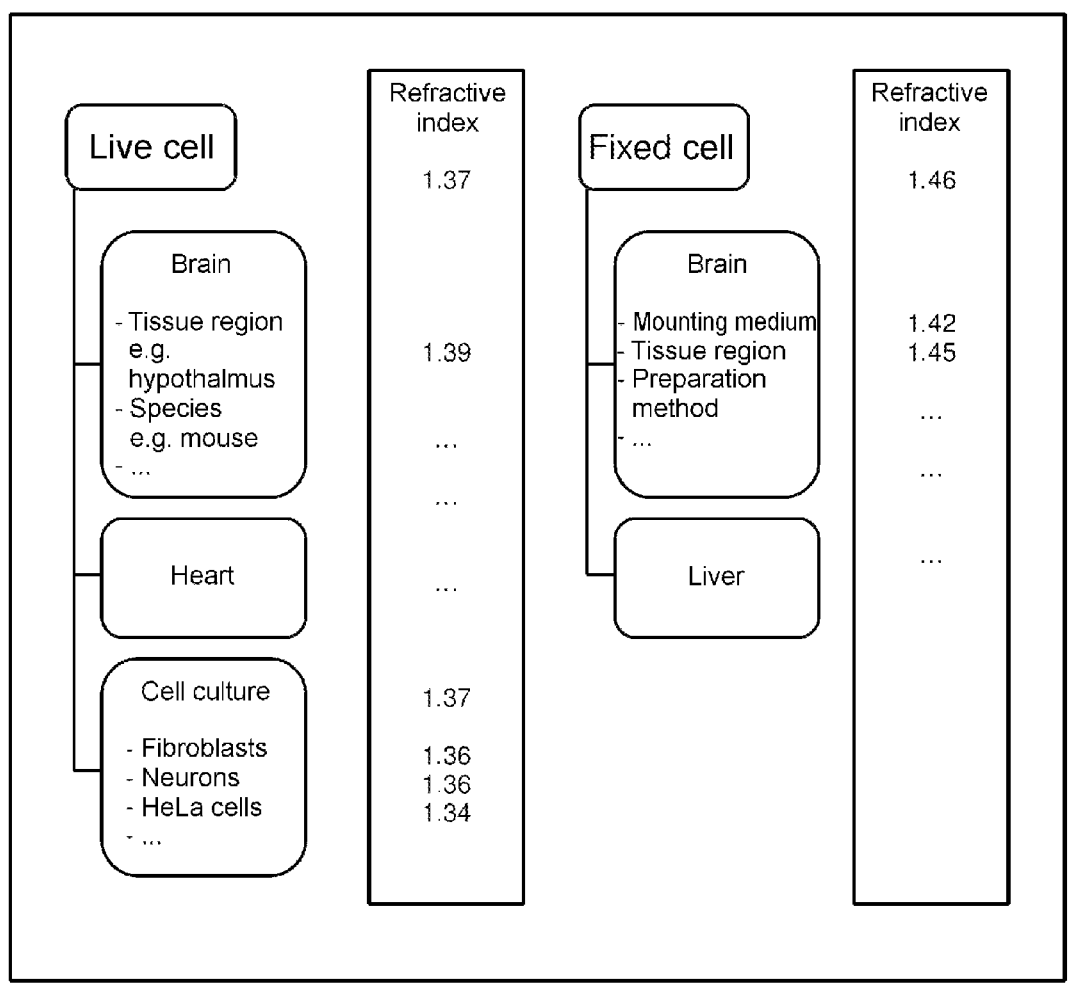
FIG. 2 shows a schematic illustration of a structure of a database for the microscope.

For high-quality imaging it is essential to find the ideal adjustment of the correction ring. To do this, the microscope 10 either comprises a database 36 or has access to a database 36. The database 36 may be stored in a dedicated memory of the microscope 10 or it may be accessible by way of remote data transmission. A relationship between various types of objects 12 and corresponding refractive indices is given by the database 36, e.g., in form of a look-up table. Further the database 36 may have a hierarchic structure, as illustrated in an exemplary manner in FIG. 2. The database 36 may be displayed to an experimenter with the aid of the display device 26. He can easily select the type of object 12 used for his experiment from the database 36, for example by means of an interface 50. This is particularly easy in case of a hierarchic configuration of the database 36. By way of example, imaging of the cells is subdivided into live-cell experiments and fixed-cell experiments, a different refractive index being assigned thereto in each case. This is a simplest distinction of the type of object 12 in respect of the sample preparation. If the experimenter has further information in respect of the type of cell, for example whether this is a brain cell, a heart cell, or the type of cell culture this relates to, the first subdivision into live-cell experiments may be further refined in respect of the type of object 12 such that the refractive index is listed for each type of object 12. This may also be provided analogously in the case of fixed-cell experiments, with, in this case, a cover medium also having an influence on the refractive index of the object 12.

Further, the microscope 10 may comprise a scanner 40, which is able to read a marking or lable on the object carrier 28. By way of example, the marking specifies the material of the object carrier 28 and the object carrier thickness OD. Further, the type of object 12 may also be encoded by the marking. By way of example, the scanner 40 can be a laser scanner and the marking can be an optical readable code, e.g., a bar code or QR code. The scanner 40 is connected to the control device 24 (not illustrated in FIG. 1). The scanner 40 may be part of the interface 50.

Refractive index is temperature dependent. Therefore, in an embodiment of the microscope 10 the control device 24 determines the temperature of the object 12. By way of example, the control device 24 can detect whether an incubated object is examined. The control device 24 then determines a temperature value and accordingly corrects the refractive index or the set value obtained from the relationship, for example by using a function or a correction table. Alternatively the relationship is multidimensional and gives the set value to be temperature-dependent.

A further aspect affecting the temperature of the object 12 is the illumination thereof. Therefore, provision is made in a development for the beam splitter 46 split off a measurement portion from the illumination beam path 23, which portion is guided to an intensity detector 38. The intensity detector 38 measures the intensity or the power of the portion. The measurement portion only may takes up a small percentage of the illumination radiation, for example 1%, 2% or 5%. In the shown embodiment, the intensity detector 38 senses the intensity of the illumination, used e.g., for exciting fluorescence radiation in the object 12. From the signal of the intensity detector 38 the control device 24 calculates heating of the object 12 caused by the illumination radiation and, thus, a temperature value of the object. It is possible, for example, also to use the type of object 12 in order to characterize the illumination absorption behavior of the object 12 in more detail. The intensity detector 38 is connected to the control device 24, even though this is not illustrated in FIG. 1.

The interface 50 may be an input device, for example a keyboard or mouse, or a sensor. The control device can determine the actual type of object 12 by reading the interface 50. By way of example, a user inputs the actual type of object 12 over the interface 50 by making a proper selection from the database 36.

The control device 24 is connected to the storage device 48, in which change in spherical aberration may be stored as a function of refractive index. This relationship may be determined beforehand by calibration and be, for example, a table. The storage device 48 may be part of the control device 24. The control device 24 may be a microprocessor, computer or the like; the storage device 48 may be a writeable memory, such as a RAM (random access memory). The control device 24 a set value for the correction optical unit 32 by means of the relationship from the storage device 48, such that the second spherical aberration compensates the first for imaging of the object 12 and overall aberration is reduced when setting the unit 32 to the set value. Then, the control device 24 actuates the drive 34 to set the unit 32 to the set value such that spherical aberration of the imaging of the object 12 is reduced, preferably minimized to the best possible extent.

Figure 3:
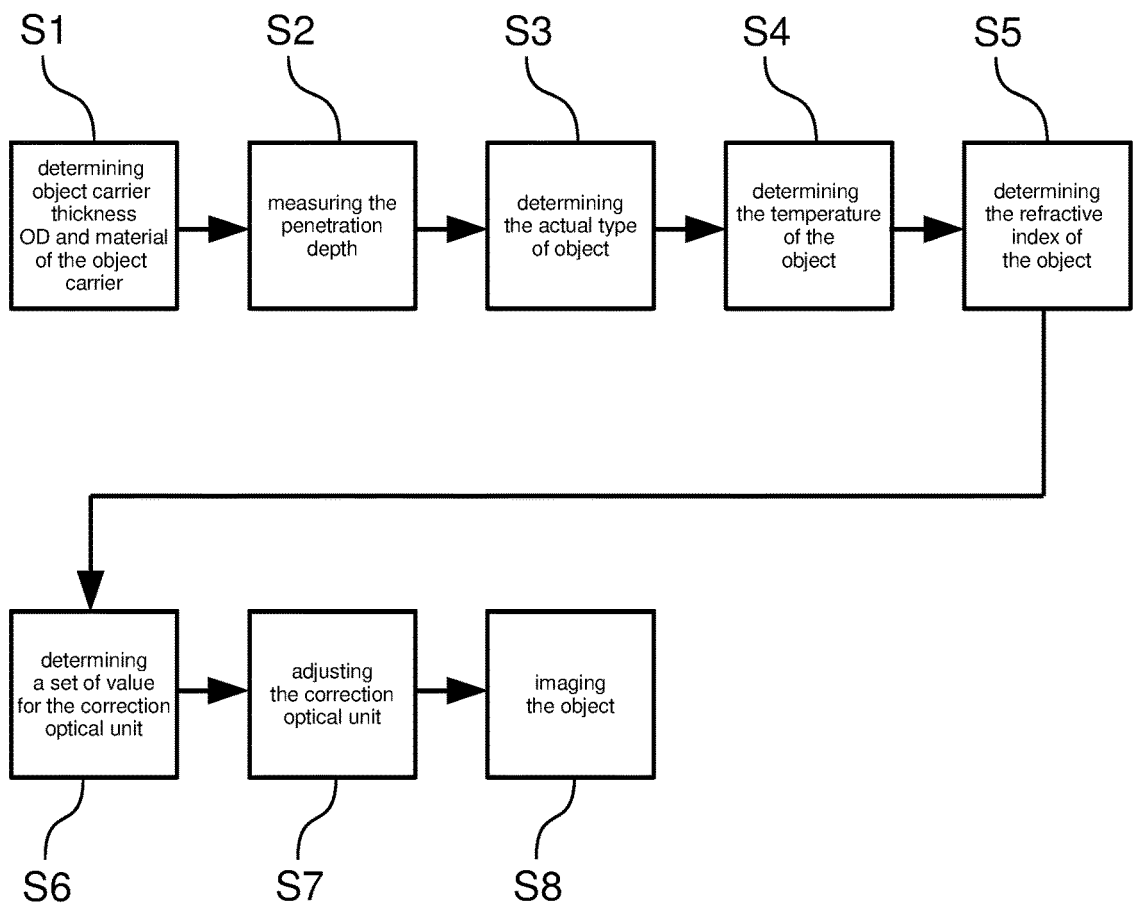
FIG. 3 shows a block diagram illustrating a method for imaging an object.

FIG. 3 is a block diagram showing a method for imaging the object 12. Object carrier thickness OD and material of the object carrier 28 are determined in an optional step S1. By way of example, this may be done with the aid of the scanner 40 which reads a marking on the object carrier 28. Alternatively, object carrier thickness OD and material of the object carrier 28 may be input over the interface 50.

A penetration depth, which specifies the distance between the focal plane and an interface of the object carrier 28, is measured in an optional step S2. To this end, it is possible, for example, to adjust the focal position of the objective 14 until a reflex from the interface between the object carrier 28 and the object 12 occurs. The adjustment travel necessary to obtain this reflex yields the distance between focal plane and interface to the object carrier 28. So the penetration depth is determined.

The actual type of object 12 is determined in step S3. A kind of specimen 12 and/or kind of preparation may be entered over the interface 50. A user selects the actual kind of object 12, for example the actual type of cell, and an actual kind of embedding or cover medium, for example from a database.

The temperature of the object 12 is determined in an optional step S4. By way of example, the temperature may be entered over the interface 50, for example an incubation temperature. Experiments on living cells are usually carried out at 37° Celsius. Further, the temperature in the object 12 may also be determined by sensing thermal power introduced in form of illumination radiation. The intensity detector 38 can be used to determine an energy parameter of the illumination radiation. The heating of the object 12 can be deduced utilizing the database based on the actual type of object 12.

The refractive index of the object 12 is determined in step S5 with the aid of the database 36 being part of the relationship, namely by the control device 24 reading the refractive index listed for the actual type of object 12 determined in step S3.

In step S6, a set value for the correction optical unit 32 is determined by utilizing the relationship stored in the storage device 48. In an optimal embodiment the refractive index of the object 12, the material of the object carrier 28, the object carrier thickness OD, the penetration depth and the temperature of the object 12 are known and used as parameters onto which the set value is based. In a minimal embodiment, the set value is a function of the refractive index or the object type only. In the latter option steps S4 and/or S5 can be dispensed with.

The relationship was ascertained prior to the experiment by calibration or the relationship is a pre-defined formula which links the parameters to the set value. Moreover, the wavelength of the radiation for imaging the object 12 and/or the immersion medium for the objective 14 may also be included as parameters into the relationship. The relationship may be a look-up table. The penetration depth can have an incremental influence on the set value only.

In step S7, the correction optical unit 32 is adjusted according to the set value. The control device 24 actuates the drive 34 according to the set value. In this way, spherical aberration is reduced, in particular minimized. The object 12 is imaged in a subsequent step S8. By way of example, the image may be a fluorescence image of the object 12.

In particular, the microscope may be adapted to carry out different imaging types. By way of example, the microscope may be adapted for wide-field imaging and/or for scanning imaging techniques, such as confocal microscopy. Further, it is optionally possible to use the microscope to capture fluorescence images of the object.

What is claimed is:

1. A method for imaging an object, the method comprising:

providing imaging optics to image the object, the imaging optics including a magnifying objective introducing a first spherical aberration influenced by a refraction index of the object and correction optics configured to introduce a second spherical aberration, wherein the correction optics are adjustable to adjust the second spherical aberration introduced by the correction optics, providing a relationship assigning set values of the correction optics according to an object type, wherein at each set value the correction optics introduce the second spherical aberration such that the second spherical aberration at least partly compensates for the first spherical aberration occurring with objects of the object type assigned to that set value so as to reduce an overall spherical aberration of the image of the object, determining the object type of the object, retrieving from the relationship a set value assigned to the object type of the object, using the retrieved set value to adjust the correction optics and imaging the object through the imaging optics to reduce the overall spherical aberration, wherein the relationship assigns the set value in two stages, namely a first stage of linking the object type with a refractive index using a database holding refractive indices as a function of the object type and a second stage of linking the refractive index to the set value based on an interrelationship between the refractive index and the set value.

2. The method as claimed in claim 1, wherein in the relationship the set value depends on at least one further parameter in addition to the refraction index that influences first spherical aberration.

3. The method as claimed in claim 2, wherein the imaging optics define a focal plane in the object and the at least one further parameter comprises at least one of:
temperature of the object,
material of an object carrier,
object carrier thickness,
immersion medium, and
wavelength of imaging, and
a depth position of the focal plane in the object.

4. The method as claimed in claims 2, wherein
the object is carried by an object carrier, and
the object carrier comprises a random-access memory (RAM) storing data comprising at least one object type and the further parameter and wherein the RAM is read.

5. The method as claimed in claim 1, wherein the imaging optics define a focal plane located in the object and, in the relationship the set value depends on a depth position of the focal plane in the object.

6. The method as claimed in claim 5, wherein
the object is carried by an object carrier, and
the depth position is measured by detecting an interface between the object carrier and the object and by measuring a distance between the interface and the focal plane in the object.

7. The method as claimed in claim 5, wherein several depth position regions are defined, wherein a dependency of the set value from the depth position is constant within each region.

8. The method as claimed in claim 7, wherein a size of the regions depends on a numerical aperture of the objective.

9. The method as claimed claim 1, wherein
the object is illuminated by illumination radiation and
a temperature the object has during imaging is determined by detecting or measuring an energy parameter of the illumination radiation and by deriving the temperature of the object from the energy parameter.

10. A microscope for imaging an object, the microscope comprising
imaging optics to image the object, the imaging optics including a magnifying objective introducing a first spherical aberration influenced by a refractive index of the object and correction optics configured to introduce a second spherical aberration, wherein the correction optics are adjustable to adjust the second spherical aberration introduced by the correction optics,
a drive for adjusting the correction optics with regard to the second spherical aberration introduced,
a processor for controlling the drive, and
a random-access memory (RAM) accessible by the processor, the RAM storing a relationship for assigning set values of the correction optics according to an object type, wherein at each set value the correction optics introduces the second spherical aberration such that the second spherical aberration at least partly compensates for the first spherical aberration occurring with objects of the object type assigned to that set so as to reduce an overall spherical aberration of the image of the object,
wherein the processor is adapted to determine the object type of the object, to retrieve from the relationship the set value assigned to the object type of the object, and to control the drive on the basis of the set value to reduce the overall spherical aberration,
wherein the RAM is configured to provide assignment of the set value in two stages, namely a first stage of linking the object type with a refractive index using a database storing refractive indices as a function of the object type and a second stage of linking the refractive index to the set value based on an interrelationship between the refractive index and the set value.

11. The microscope as claimed in claim 10, wherein in the relationship hold in the RAM the set value is dependent on at least one further parameter that influences the first spherical aberration.

12. The microscope as claimed in claim 11, wherein the imaging optics define a focal plane in the object and the at least one further parameter comprises at least one of:
temperature of the object,
material of an object carrier,
object carrier thickness,
immersion medium,
wavelength of imaging, and
a depth position of the focal plane.

13. The microscope as claimed in claims 11, further comprising
an object carrier, wherein the object carrier comprises a memory storing data indicating at least one object type and the further parameter, and
a memory reading device for inputting read data to the control device.

14. The microscope as claimed in claim 10, wherein the imaging optics define a focal plane located in the object and in the relationship stored in the RAM, the set value is dependent on a depth position of the focal plane in the object.

15. The microscope as claimed in claim 14, wherein
the objective is adjustable regarding the depth position of the focal plane,
the processor is adapted for controlling the objective regarding the depth position,
the microscope further comprises an object carrier for the object, and
the processor is adapted to measure the depth position by detecting an interface between the object carrier and the object and by measuring a distance between the interface and the focal plane in the object.

16. The microscope as claimed in claim 14, wherein several depth position regions are defined, wherein a dependency of the set value from the depth position is constant within each region.

17. The microscope as claimed in claim 16, wherein the microscope further comprises an objective change device for selecting a utilized one of several different objectives and wherein a size of the regions depends on a numerical aperture of the objective utilized.

18. The microscope as claimed claim 10, further comprising:
- an illumination beam path to illuminate the object by illumination radiation and
- a detecting or measuring device for detecting or measuring an energy parameter of the illumination radiation,
- wherein the control device is adapted to determine a temperature the object has during imaging by deriving the temperature of the object from the energy parameter.

19. The microscope as claimed claim 10, wherein the control device is adapted to perform a microscopy method comprising:
- determining the object type of the object,
- retrieving from the relationship the set value assigned to the object type,
- using the retrieved set value to adjust the correction optics and imaging the object through the imaging optics with reduced overall spherical aberration,
- wherein the relationship assigns the set value in two stages, namely the first stage of linking the object type with the refractive index using the database holding refractive indices as a function of the object type and the second stage of linking the refractive index to the set value based on the interrelationship between the refractive index and the set value.

\* \* \* \* \*